United States Patent [19]

Iwata

[11] Patent Number: 4,462,113

[45] Date of Patent: Jul. 24, 1984

[54] CORDLESS TRANSMITTING AND RECEIVING APPARATUS

[75] Inventor: Keisuke Iwata, Tokyo, Japan

[73] Assignee: Iwata Electric Co., Ltd., Tokyo, Japan

[21] Appl. No.: 447,529

[22] Filed: Dec. 7, 1982

[30] Foreign Application Priority Data

Jul. 6, 1982 [JP] Japan .................................. 57-117557

[51] Int. Cl.³ .......................... H04B 7/14; H04H 1/08
[52] U.S. Cl. ......................................... 455/20; 455/41;
179/2.51; 179/2 EA; 340/310 R
[58] Field of Search ........................ 455/11, 14, 20, 41,
455/54, 55; 179/2 EA, 2.51, 82; 340/310 R, 310 A

[56] References Cited

U.S. PATENT DOCUMENTS

| | | | |
|---|---|---|---|
| 2,298,435 | 10/1942 | Tunick | 455/14 |
| 2,411,786 | 11/1946 | Halstead | 179/2.51 |
| 2,962,547 | 6/1976 | Pattantyus-Abraham | 179/2.51 |
| 3,280,259 | 10/1966 | Cotter | 179/2.51 |
| 3,366,744 | 1/1968 | Miller | 179/2 EA |
| 4,058,678 | 11/1977 | Dunn et al. | 179/2.51 |

FOREIGN PATENT DOCUMENTS 22107 2/1979 Japan .................................. 179/2.51

*Primary Examiner*—Jin F. Ng
*Attorney, Agent, or Firm*—Robert E. Burns; Emmanuel J. Lobato; Bruce L. Adams

[57] ABSTRACT

A cordless transmitting and receiving apparatus which is capable of providing transmitting and receiving between a key transmitting and receiving apparatus such as a telephone and a portable remote transmitting and receiving apparatus and in which a transmission signal from the key transmitting and receiving apparatus is received in the remote transmitting and receiving apparatus by electromagnetic induction through a commercial AC power line. The cordless transmitting and receiving apparatus has a relay transmitter, which transmits a transmission signal from said remote transmitting and receiving apparatus to said key transmitting and receiving apparatus through said AC line. The receiving circuit of said key transmitting and receiving apparatus is electrically connected to said AC line whereby the transmission signal from said transmitting and receiving apparatus is transmitted to said relay transmitter in a wireless fashion and transmitted between said relay transmitter and said key transmitting and receiving apparatus by said AC line.

5 Claims, 3 Drawing Figures

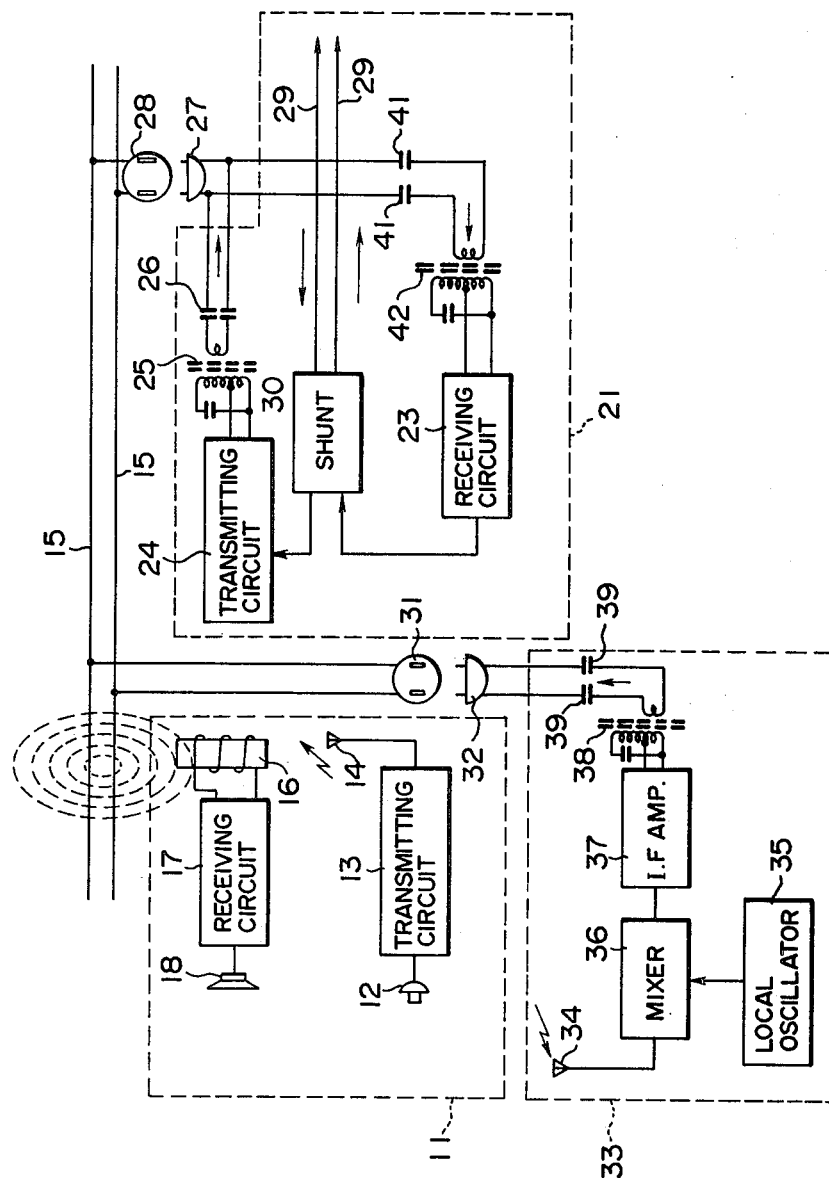

CORDLESS TRANSMITTING AND RECEIVING APPARATUS

FIELD AND BACKGROUND OF THE INVENTION

The present invention relates to a remote transmitting and receiving apparatus for receiving a signal, which is received by a key transmitting and receiving apparatus such as telephones, at a position distanced from said key transmitting and receiving apparatus and for transmitting said signal at a position distanced from said key transmitting and receiving apparatus through said apparatus, and more specifically, to a cordless transmitting and receiving apparatus which uses a commercial power line in a transmission line of signal to the key transmitting and receiving apparatus and can provide transmitting and receiving between said cordless transmitting and receiving apparatus and the key transmitting and receiving apparatus without use of a communication exclusive-use cord.

In the past, various remote transmitting and receiving apparatuses have been proposed wherein in a room separately from a room where a telephone is set, an aural signal is transmitted to an external telephone line through said telephone or a signal transmitted to said telephone is received. In prior art remote transmitting and receiving apparatus, the signal from the telephone is transmitted by making use of an in-door commercial power line and the signal to the telephone is transmitted wirelessly from antennas provided on the remote transmitting and receiving apparatus and the telephone, respectively, and such a conventional apparatus is widely called a wireless transmitting and receiving apparatus because it has not exclusive-use signal cord.

One embodiment of the prior art wireless transmitting and receiving apparatus as described will be explained with reference to FIG. 1. A remote transmitting and receiving apparatus 11 comprises a receiving station and a transmitting station, said receiving station comprising a microphone 12 for entry of aural signal, a transmission circuit 13 input of which is connected to output of said microphone 12 and having a modulation circuit, an amplification circuit, etc., and an antenna 14 connected to output of said transmission circuit 13 to transmit an output signal thereof, said receiving station comprising a loop antenna 16 electromagnetically coupled to an AC line 15 of a commertial power supply for in-door wiring, a receiving circuit 17 input of which is connected to the loop antenna 16 and having a frequency conversion circuit, an intermediate frequency amplification circuit, a detection circuit, etc., and a speaker 18 connected to output of the receiving circuit 17 to put out a received signal as an aural signal. On the other hand, a key transmitting and receiving apparatus 21 such as a telephone comprises a receiving station and a transmitting station, said receiving station comprising an antenna 22 for receiving a signal from the antenna 14 of the remote transmitting and receiving apparatus 11 and a receiving circuit 23 similar to the aforesaid receiving circuit 17, of which input is connected to said antenna 22, said transmitting station comprising a transmission circuit 24 similar to the aforesaid transmission circuit 13, a transformer 25 for transmission output, of which input is connected to output of said transmission circuit 24, and a coupling capacitor 26 connected to output of said transformer 25. Output of the coupling capacitor 26 is connected to a transmitting and receiving plug 27, which is in turn connected to a convenience 28 for AC power supply in a room where the key transmitting and receiving apparatus 21 is installed. The convenience 28 is connected to an AC line 15. The key transmitting and receiving apparatus 21 is provided with a signal shunt 30 including a hybrid coil, which supplies a received signal from the receiving circuit 23 to an external telephone line 29 and supplies a signal sent from the telephone line 29 to the transmitting circuit 24.

The aural signal from the microphone 12 of the remote transmitting and receiving apparatus 11 is transmitted by the transmission circuit 13 through the antenna 14 while carrying it on, for example, a carrier wave of 49 MHz, and said signal is received by the antenna 22 of the key transmitting and receiving apparatus 21. The signal received by the antenna 22 is subjected to the required signal processing at the receiving circuit 23, after which it is sent to the external telephone line 29 through the signal shunt 30. On the other hand, the aural signal transmitted from the telephone line 29 is supplied to the transmission circuit 24 via the signal shunt 30. In the transmission circuit 24, said signal is carried on, for example, carrier wave of 1.7 MHz, and supplied to the AC line 15 through the coupling capacitor 26. The transmission signal carried on the AC line 15 is subjected to electromagnetic induction by the loop antenna 16 of the remote transmitting and receiving apparatus 11, and a wave containing the thus guided voice is subjected to the required receiving processing in the receiving circuit 17, after which it is released by the speaker 18. In this manner, the transmission from the remote transmitting and receiving apparatus 11 to the key transmitting and receiving apparatus 21 is effected by the transmission of the wave by the antenna 22, whereas the transsission to the key transmitting and receiving apparatus 21 is effected through the AC line 15.

In the prior art wireless transmitting and receiving apparatus as described above, a carrier-frequency signal from the remote transmitting and receiving apparatus 11 to the key transmitting and receiving apparatus 21 is 49 MHz of VHF (very high frequency) band as previously mentioned, and if said signal is intended to be used for transmission and receiving between rooms which are partitioned by a number of walls and floors in buildings or the like, the transmission efficiency is considerably decreased due to the presence of these walls and floors. On the other hand, the use of a carrier-frequency signal of approximately 1.7 MHz of MF (medium frequency) band which not largely affects on the transmission efficiency can be contemplated, but to this end, the length of the antennas 14 and 22 must be extended greatly. In the key transmitting and receiving apparatus 21 which is the fixed station, it is not inconvenient to extend the length of the antenna 22 thereof, but in the remote transmitting and receiving apparatus 11, the antenna is preferably of the handy type in terms of the nature thereof. Thus, the lengthy antenna is inconvenient to carry for such a handy type transmitting and receiving apparatus.

SUMMARY OF THE INVENTION

It is an object of the present invention to provide a wireless transmitting and receiving apparatus which will not deteriorate the transmission efficiency even if the remote transmitting and receiving apparatus is used in a room with a number of walls and floors shielded from a room where a key transmitting and receiving apparatus is installed.

A further object of the present invention is to provide a handy wireless transmitting and receiving apparatus which can provide transmission and receiving of signals clearly without deteriorating the transmission efficiency even if the length of the antenna of the remote transmitting and receiving apparatus is made shorter.

In accordance with the present invention, there is provided a cordless transmitting and receiving apparatus which is capable of providing transmitting and receiving between a key transmitting and receiving apparatus as a fixed station and a portable remote transmitting and receiving apparatus and in which a transmission signal from the key transmitting and receiving apparatus is received in the remote transmitting and receiving apparatus by electromagnetic induction through a commercial AC power line, said remote transmitting and receiving apparatus comprising a transmitting station including an aural signal transmitting circuit and a first antenna for transmitting an output signal of said circuit and a receiving station including a second antenna electromagnetically coupled to an AC line and a receiving circuit for converting the output signal of said second antenna into an aural signal to put out the latter, said key transmitting and receiving apparatus comprising a receiving circuit electrically connected to the AC line, a signal shunt for transmitting an output signal of said receiving circuit to an external telephone line and a transmitting circuit for putting out the transmission signal from said external telephone line to the AC line through the signal shunt circuit, said cordless transmitting and receiving apparatus further comprising a relay transmitter including a third antenna for receiving an output signal of the first antenna of the remote transmitting and receiving apparatus, a frequency converter for frequency-converting the output signal of said third antenna and connection means for applying the output signal of said frequency converter to the AC line.

In accordance with a preferred embodiment of the present invention, the relay transmitter converts an input signal from the first antenna of the remote transmitting and receiving apparatus into an intermediate frequency signal and applies said intermediate frequency signal to the AC line through a coupling capacitor. The receiving circuit of the key transmitting and receiving apparatus is connected to the AC line, and the received intermediate frequency signal is applied to the signal shunt through a detection circuit.

In the cordless transmitting and receiving apparatus of the present invention, a transmission signal from the remote transmitting and receiving apparatus is fed by the relay relay transmitter to the key transmitting and receiving apparatus through the commercial AC power line, and the relay transmitter can be installed in the room where the remote transmitting and receiving apparatus is installed and connected to a convenience in the room. Accordingly, the wireless transmission can be carried out merely between the remote transmitting and receiving apparatus and the relay transmitter, and therefore, a carrier wave of 49 MHz as in prior art can be used. Thus, the transmission and receiving of a signal between remote rooms or between rooms located on different floors may be carried out clearly without extending the length of the first antenna.

BRIEF DESCRIPTION OF THE DRAWINGS

FIG. 2 is a block diagram showing one embodiment of an endless transmitting and receiving apparatus in accordance with the present invention.

DESCRIPTION OF THE PREFERRED EMBODIMENT

Figure 1:
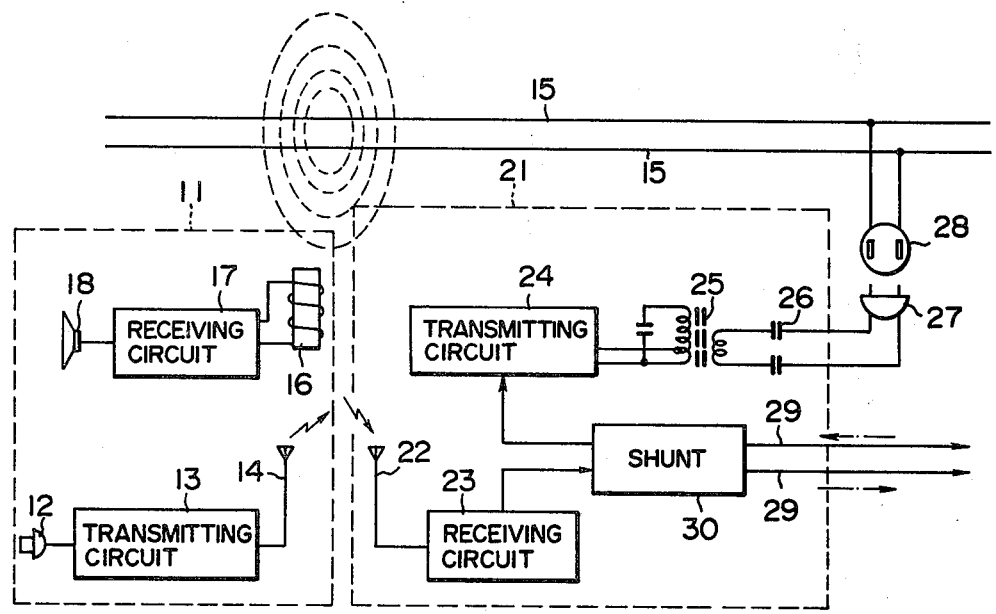
FIG. 1 is a block diagram showing one example of a prior art endless transmitting and receiving apparatus.

Referring now to FIG. 2, a remote transmitting and receiving apparatus and a key transmitting and receiving apparatus 21 are shown. In this embodiment, the same elements as those in the prior art wireless transmitting and receiving apparatus previously explained with reference to FIG. 1 bear the same reference numerals, which detailed description is omitted. A plug 32 is connected to a convenience 31 in a room where the remote transmitting and receiving apparatus 11 is located. The plug 32 is connected to the output of a relay transmitter 33. The relay transmitter 33 comprises an antenna 34 for receiving a wave of 49 MHz transmitted from an antenna 14 of the remote transmitting and receiving apparatus, a mixer 36 input of which is connected to the antenna 34 and to a local oscillator 35 and which puts out an intermediate frequency signal of 100 to 400 KHz to the output thereof, an intermediate frequency amplifier 37 input of which is connected to the output of the mixer 36, a transformer 38 for immediate frequency output similar to the aforementioned transformer 26, of which primary is connected to the amplifier 37, and a coupling capacitor 39 connected between a secondary of the transformer and the plug 32. While only one convenience 31 is shown in FIG. 2, it will be noted that a plurality of conveniences may be provided in rooms and corridors within the building in spaced apart relation, and the plug 32 of the relay receiver 33 is suitably plugged in said convenience.

On the other hand, in the key transmitting and receiving apparatus 21, a coupling capacitor 41 and a receiving transformer 42 are connected between a receiving circuit 23 and a plug 27. The receiving circuit 23 has a detection circuit, a low frequency amplifier after the intermediate amplifier.

Figure 3:
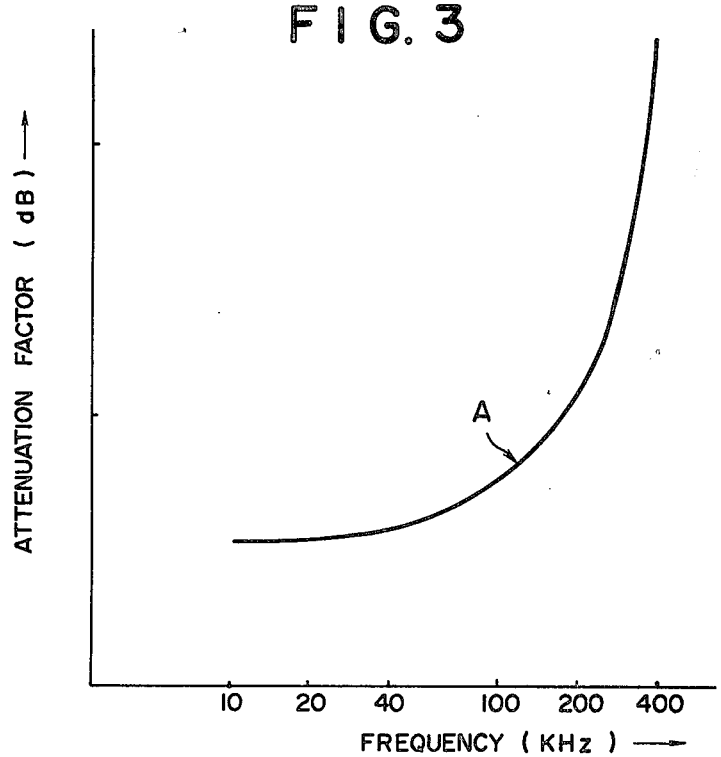
FIG. 3 is a graphic representation showing an attenuation factor in an AC line of an intermediate frequency signal.

In use, first, the plug 32 of the relay transmitter 33 is plugged in the convenience in the room where the remote transmitting and receiving apparatus 11 or in the nearest plug 31. Subsequently, an aural signal carrying a carrier wave of for example 49 MHz is put into the antenna 14 from the transmitting circuit 13 of the remote transmitting and receiving apparatus carried into the room, in a manner similar to prior arts, and the wave from the antenna 14 is received by the antenna 34 of the relay receiver 33. The thus received signal is mixed by the mixer 36 with the oscillation signal from the local oscillator 35 and converted into the intermediate frequency signal. After the intermediate frequency signal has been amplified by the intermediate frequency amplifier 37, said signal is applied to the AC line 15 through the transformer 38, the coupling capacitor 39, the plug 33 and the convenience 31. The intermediate frequency signal flowing into the AC line 15 is applied to the receiving circuit 23 through the coupling capacitor 41 and the transformer 42 of the key transmitting and receiving apparatus 21. The receiving circuit 23 detects and low-frequency amplifies to putoout the signal to the telephone line 29 via the signal shunt. In this manner, the transmission signal from the remote transmitting and receiving apparatus 11 is transmitted through the AC line 15 to the key transmitting and receiving apparatus by the relay transmitter 33 which functions as a signal converter, and therefore, the signal can be received with high sensitivity and the in-door wiring of the building may be utilized for the AC line 15 without modification. While the frequency supplied to the AC line within the building can be suitably selected, it has been assured by experiments that in consideration of the attenuation factor in view of various requirements, the optimal frequency is 100 KHz to 400 KHz as shown in the curve A of FIG. 3.

What is claimed is:

1. A cordless transmitting and receiving apparatus which is capable of providing transmitting and receiving between a key transmitting and receiving apparatus as a fixed station and a portable remote transmitting and receiving apparatus and in which a transmission signal from the key transmitting and receiving apparatus is received in the remote transmitting and receiving apparatus by electromagnetic induction through a commercial AC power line, said remote transmitting and receiving apparatus comprising a transmitting station including an aural signal transmitting circuit and a first antenna for transmitting an output signal of said circuit and a receiving station including a second antenna electromagnetically coupled to an AC line and a receiving circuit for converting the output signal of said second antenna into an aural signal to put out the latter, said key transmitting and receiving apparatus comprising a receiving circuit electrically connected to the AC line, a signal shunt for transmitting an output signal of said receiving circuit to an external telephone line and a transmitting circuit for putting out the transmission signal from said external telephone line to the AC line through the signal shunt circuit, said cordless transmitting and receiving apparatus further comprising a relay transmitter including a third antenna for receiving an output signal of the first antenna of the remote transmitting and receiving apparatus, a frequency converter for frequency-converting the output signal of said third antenna and connection means for applying the output signal of said frequency converter to the AC line.

2. The apparatus of claim 1 wherein said frequency converter converts the output signal of said third antenna into an intermediate frequency signal in the range from 100 KHz to 400 KHz.

3. The apparatus of claim 1 wherein said connection means comprises a plug connected to the output of said converter and a convenience connected to said AC line.

4. The apparatus of claim 1 wherein a coupling capacitor and a transformer for receiving an intermediate frequency signal are connected between said receiving circuit and said AC line of said key transmitting and receiving apparatus.

5. The apparatus of claim 3 wherein a coupling capacitor and a transformer for putting out an intermediate frequency signal are connected between said converter and said plug.

* * * * *